US010520367B2

(12) United States Patent
Harvey

(10) Patent No.: US 10,520,367 B2
(45) Date of Patent: Dec. 31, 2019

(54) SYSTEMS AND METHODS OF ALERTING CUSTOMERS TO CHANGES IN PRODUCT TEMPERATURES DURING DELIVERY

(71) Applicant: Walmart Apollo, LLC, Bentonville, AR (US)

(72) Inventor: Robert Nicholas Harvey, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 172 days.

(21) Appl. No.: 15/621,284

(22) Filed: Jun. 13, 2017

(65) Prior Publication Data
US 2017/0363479 A1 Dec. 21, 2017

Related U.S. Application Data

(60) Provisional application No. 62/350,246, filed on Jun. 15, 2016.

(51) Int. Cl.
*G01K 11/00* (2006.01)
*G01K 1/00* (2006.01)
(Continued)

(52) U.S. Cl.
CPC ............. *G01K 1/024* (2013.01); *G01K 3/04* (2013.01); *G01K 3/10* (2013.01); *G01K 11/12* (2013.01);
(Continued)

(58) Field of Classification Search
USPC ....... 374/100, 141, 106, 101, 102, 103, 104, 374/159, 161, 162, 208; 116/208, 26,
(Continued)

(56) References Cited

U.S. PATENT DOCUMENTS 4,816,646 A   3/1989 Solomon
6,169,270 B1   1/2001 Check
(Continued)

FOREIGN PATENT DOCUMENTS

CN   202063352   12/2011
CN   204428455   7/2015

OTHER PUBLICATIONS

Pizza Hut Philippines; "Pizza Hut ~ Hot on the Dot", https://www.youtube.com/watch?v=inNKNP64ts, published on Aug. 5, 2011, pp. 1.
(Continued)

*Primary Examiner* — Mirellys Jagan
(74) *Attorney, Agent, or Firm* — Fitch, Even, Tabin & Flannery LLP

(57) ABSTRACT

Systems, apparatuses and methods are provided herein for alerting customers to product temperature compliance during delivery whereby a retail product intended to be maintained below one or more temperature threshold values through a supply chain delivery process is identified, a temperature threshold value of the retail product is determined, an irreversible thermochromic indicator having an activation temperature that corresponds to the temperature threshold value of the retail product is identified, the thermochromic indicator is affixed to the retail product prior to commencing the supply chain delivery process, and verification, via a user interface, is obtained from a customer receiving the retail product that the thermochromic indicator is in its inactivated state.

12 Claims, 4 Drawing Sheets

(51) Int. Cl.
*G01K 3/00* (2006.01)
*G01K 1/02* (2006.01)
*G01K 3/10* (2006.01)
*G01K 11/12* (2006.01)
*G06Q 10/08* (2012.01)
*H04Q 9/00* (2006.01)
*G01K 3/04* (2006.01)

(52) U.S. Cl.
CPC ............... *G06Q 10/08* (2013.01); *H04Q 9/00* (2013.01); *H04Q 2209/823* (2013.01)

(58) Field of Classification Search
USPC .................................................. 116/207, 216
See application file for complete search history.

(56) References Cited

U.S. PATENT DOCUMENTS

| | | | |
|---|---|---|---|
| 6,544,925 B1 | 4/2003 | Prusik | |
| 6,566,631 B2 | 5/2003 | Faries | |
| 7,514,262 B2* | 4/2009 | Ribi | G01N 31/229 116/206 |
| 2002/0056756 A1* | 5/2002 | Cameron | G06K 19/06018 235/468 |
| 2010/0012018 A1* | 1/2010 | Ribi | C09B 57/10 116/207 |
| 2010/0192833 A1* | 8/2010 | Yang | G01K 11/06 116/217 |
| 2012/0174853 A1 | 7/2012 | Wilson | |
| 2013/0068155 A1* | 3/2013 | Patel | G01K 3/04 116/201 |
| 2016/0071000 A1 | 3/2016 | Nemet | |
| 2016/0194132 A1* | 7/2016 | Davidson | G01K 11/12 700/213 |
| 2017/0229000 A1* | 8/2017 | Law | G06Q 10/087 |
| 2017/0364927 A1* | 12/2017 | Atkinson | G06Q 10/0832 |
| 2018/0018626 A1* | 1/2018 | Kagawa | G06K 7/1413 |
| 2018/0189535 A1* | 7/2018 | Ishida | G01K 11/12 |
| 2018/0365704 A1* | 12/2018 | Atkinson | G06K 19/06028 |

OTHER PUBLICATIONS

Rogell, Eric; "Limited Edition TUACA Bottles Get Color-Changing Thermochromatic Tattoos (Plus Some Cool Cocktail Recipes)", Website; Dec. 27, 2011, pp. 1-4.

Jaslow, Ryan; "Smart tags change color when food goes bad"; http://www.cbsnews.com/news/smarttagschangecolorwhenfoodgetsspoiled/; Mar. 17, 2014, pp. 1-3.

LCR Hallcrest; "Thermostrip® DL"; https://web.archive.org/web/20160608234743/https://www.hallcrest.com/our-products/dishwasher-disinfection-labels; Jun. 8, 2016, pp. 1-3.

Skyrad Ltd; "Irreversible Thermochromic"; https://web.archive.org/web/20160205061423/http://sky-rad.com/irreversible-thermochromic/; Feb. 5, 2016, pp. 1-2.

PCT; App. No. PCT/US2017/37449; International Search Report and Written Opinion dated Sep. 7, 2017.

* cited by examiner

SYSTEMS AND METHODS OF ALERTING CUSTOMERS TO CHANGES IN PRODUCT TEMPERATURES DURING DELIVERY

RELATED APPLICATION

This application claims the benefit of U.S. Provisional Application No. 62/350,246 filed on Jun. 15, 2016, which is incorporated herein by reference in its entirety.

TECHNICAL FIELD

This invention relates generally to alerting customers to changes in product temperatures during delivery. More specifically, this invention relates to alerting customers to product temperature compliance.

BACKGROUND

In a modern retail environment, there is a need to improve the customer service and/or convenience for the customer. One aspect of customer service is the delivery of products. There are numerous ways to delivery products to customers. Getting the product to a delivery location, however, can adversely affect the product, can cause undesirable delays, can add cost and reduce revenue. It is important to customers that perishable products are maintained at recommended temperatures during the supply chain process. Being able to easily determine compliance with recommended temperature ranges can provide increased confidence in the product.

BRIEF DESCRIPTION OF THE DRAWINGS

Disclosed herein are embodiments of systems, apparatuses and methods pertaining to alerting a customer to product temperature compliance. This description includes drawings, wherein.

Figure 1:
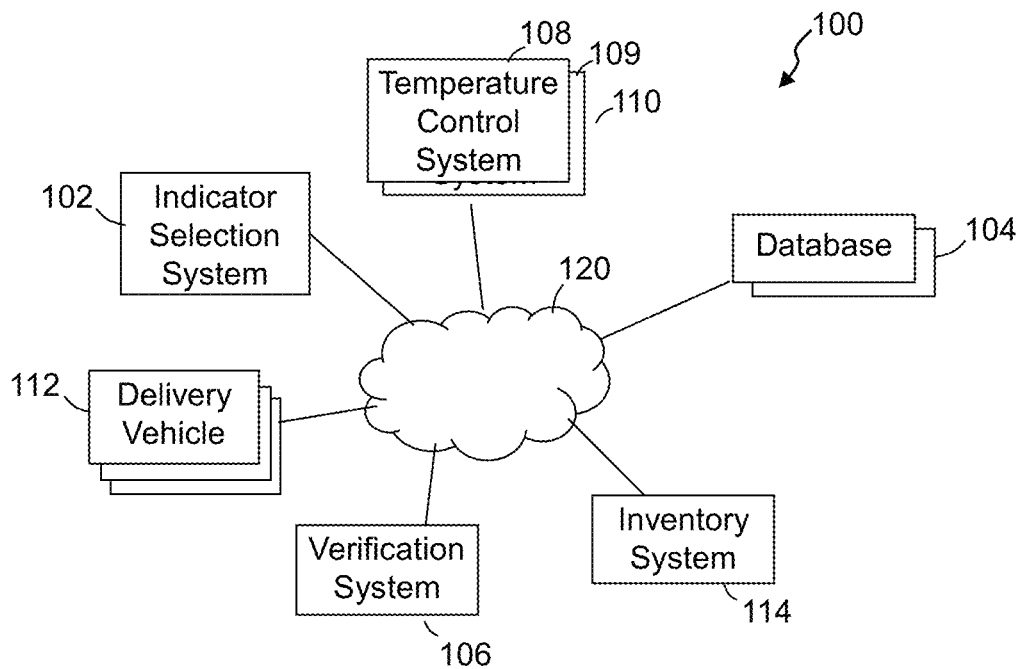
FIG. 1 illustrates a simplified block diagram of an exemplary customer alert system of alerting customers to product temperature compliance during delivery, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to alert customers to product temperature compliance during delivery. In some embodiments, a retail product intended to be maintained below a defined temperature through a supply chain delivery process is provided. The supply chain delivery process may include at least a portion thereof where the retail product is subject to an uncontrolled temperature environment. For example, one or more products may be transported to a delivery location in a delivery vehicle wherein the cargo area of the delivery vehicle is an uncontrolled temperature environment. In another example, the cargo area of the delivery vehicle may be temperature-controlled, but may experience an intermittent interruption whereby the temperature environment is no longer controlled. In such cases, the temperature of one or more products may increase above a threshold temperature. Even when the temperature-controlled environment is restored, and the temperature of the one or more products decreases below the threshold temperature, it may be difficult to determine whether the product experienced a temporary rise in temperature above its threshold, especially if the temperature of the product is below the threshold when the customer receives the product.

In the customer alert system describe herein, an irreversible thermochromic indicator is affixed, or otherwise applied, to one or more retail products that are intended to be maintained below one or more defined temperatures during the supply chain delivery process. The thermochromic indicator has an activation temperature that corresponds to a temperature threshold value of the retail product. The thermochromic indicator may be an irreversible thermochromic indicator, such that the thermochromic indicator is capable of irreversibly changing color from a first color to a second color when a temperature of the thermochromic indicator increases above the activation temperature during any point in time during the supply chain delivery process. Thus, if a retail product experiences an increase in temperature above the activation temperature of the thermochromic indicator at any point during the supply chain delivery process, even if the temperature change is temporary, the customer will be alerted to the product temperature non-compliance by the irreversible color change of the thermochromic indicator.

FIG. 1 illustrates a simplified block diagram of an exemplary customer alert system, in accordance with some embodiments. The customer alert system 100 may include an indicator selection system 102 that identifies one or more products having a delivery temperature threshold and selects one or more thermal indicators corresponding to the temperature threshold(s), and one or more databases 104 (e.g., one or more inventory databases, product databases, product temperature requirements databases, geographic temperature databases, route parameter databases, etc.). Some embodiments may further include a customer verification system 106 for allowing customers to verify that the delivered the product has not exceeded one or more threshold temperatures during delivery. Some embodiments may further include multiple different types of temperature control systems 108-110 for maintaining a temperature during delivery, and multiple different types of delivery vehicles 112. Some embodiments may further include one or more inventory systems 114 associated with one or more retail facilities.

One or more computer and/or communication networks 120 establish communication connections between two or more of the components of the system 100 and allow communications and/or data transmissions between two or more of the components of the system 100. In some embodiments, the customer alert system 100 is associated with one or more retail facilities from which products can be purchased and/or that coordinates delivery of those products. The shopping facility may, in some instances, be a retail facility, a fulfillment center, a distribution center, or other type of facility in which products are sold and/or distributed to customers. The facility may be any size or format, and may include products from one or more merchants. For example, a facility may be a single store operated by one merchant, a chain of two or more stores operated by one entity, or may be a collection of stores covering multiple merchants.

The indicator selection system 102 is configured to identify one or more products that have one or more threshold temperatures that are to be maintained and/or not to be exceeded during delivery to a delivery location. For example, a product may have one or more of a desired storage threshold temperature, a desired transport temperature, a regulatory or government specified temperature threshold, other such temperature thresholds, and in some instances a combination of two or more temperature thresholds. Further, some of the temperature thresholds may correspond to time thresholds, where for a particular product it may be desired that the product be maintained below a first temperature threshold, but can exceed the first temperature for less than a threshold duration of time and typically while being maintained under a second temperature threshold. Non-limiting examples of products that may have one or more temperature thresholds during delivery may include, for example, food products, pharmaceutical products, medical devices, horticulture products, or other perishable products. One or more databases 104 may be accessed (e.g., product database, inventory database, regulatory database, product temperature requirements database, geographic temperature database, etc.) to identify or otherwise determine temperature threshold information for each product to be delivered. In some embodiments, a first temperature threshold may correspond to a first zone of the retail product and a second temperature threshold may correspond to a second zone of the retail product. The first and second temperature thresholds may be the same or different temperature threshold values. Specific threshold delivery temperatures are further identified or otherwise determined by the indicator selection system 102 for each product.

The indicator selection system 102 is further configured to identify, select, or provide one or more thermochromic indicators having an activation temperature that corresponds to the one or more threshold delivery temperatures of each product. The thermochromic indicator may comprise any thermochromic material or composition that is capable of irreversibly changing color when a temperature of the thermochromic indicator increases above a predetermined activation temperature. For example, the thermochromic indicator may comprises at least one of thermochromic ink, thermochromic liquid crystals, thermochromic leuco dye, thermochromic paper, thermochromic polymer, and combinations thereof.

In some embodiments, the thermochromic indicator may include an adhesive material and/or a binder to affix the thermochromic material or composition to the retail product. For example, in some embodiments, the thermochromic indicator may comprise a substrate having an adhesive surface and a printable surface, and a thermochromic composition or material printed on the printable surface of the substrate. The thermochromic material may comprise any thermochromic material or composition described above. For example, the thermochromic surface may include a thermochromic ink. In some embodiments, the thermochromic indicator may be a sticker or label comprising an adhesive surface and a thermochromic surface. In other embodiments, the thermochromic indicator may include a thermochromic pigment and a binder, such that the thermochromic indicator may resemble an adhesive paint or paste that may be applied to the retail product. The binder may be any conventional binder material known in the art, while the thermochromic material may comprise any thermochromic material or composition known in the art.

In some embodiments, the indicator selection system 102 may evaluate information from the one or more databases 104 (e.g., one or more inventory databases, product databases, product temperature requirements databases, geographic temperature databases, route parameter databases, etc.) to automatically determine and/or select a specific thermochromic indicator from a plurality of different irreversible thermochromic indicators, with each indicator having a different predetermined activation temperature. In some embodiments, the activation temperature of the thermochromic indicator may correspond to a temperature safety value associated with the retail product such that the thermochromic indicator changing color from the first color to the second color indicates to the customer upon delivery that the retail product may be unsafe for its recommended use.

In some embodiments, the indicator selection system 102 may automatically output an indication of the selected thermochromic indicator, such as, for example, a bar code, UPC code, QR code or any other identifier, to an indicator applicator, which may automatically obtain and cause the indicator to be applied to the retail product based on the indication. In some embodiments, a worker may affix or otherwise apply the thermochromic indicator to the retail product.

Figure 4:
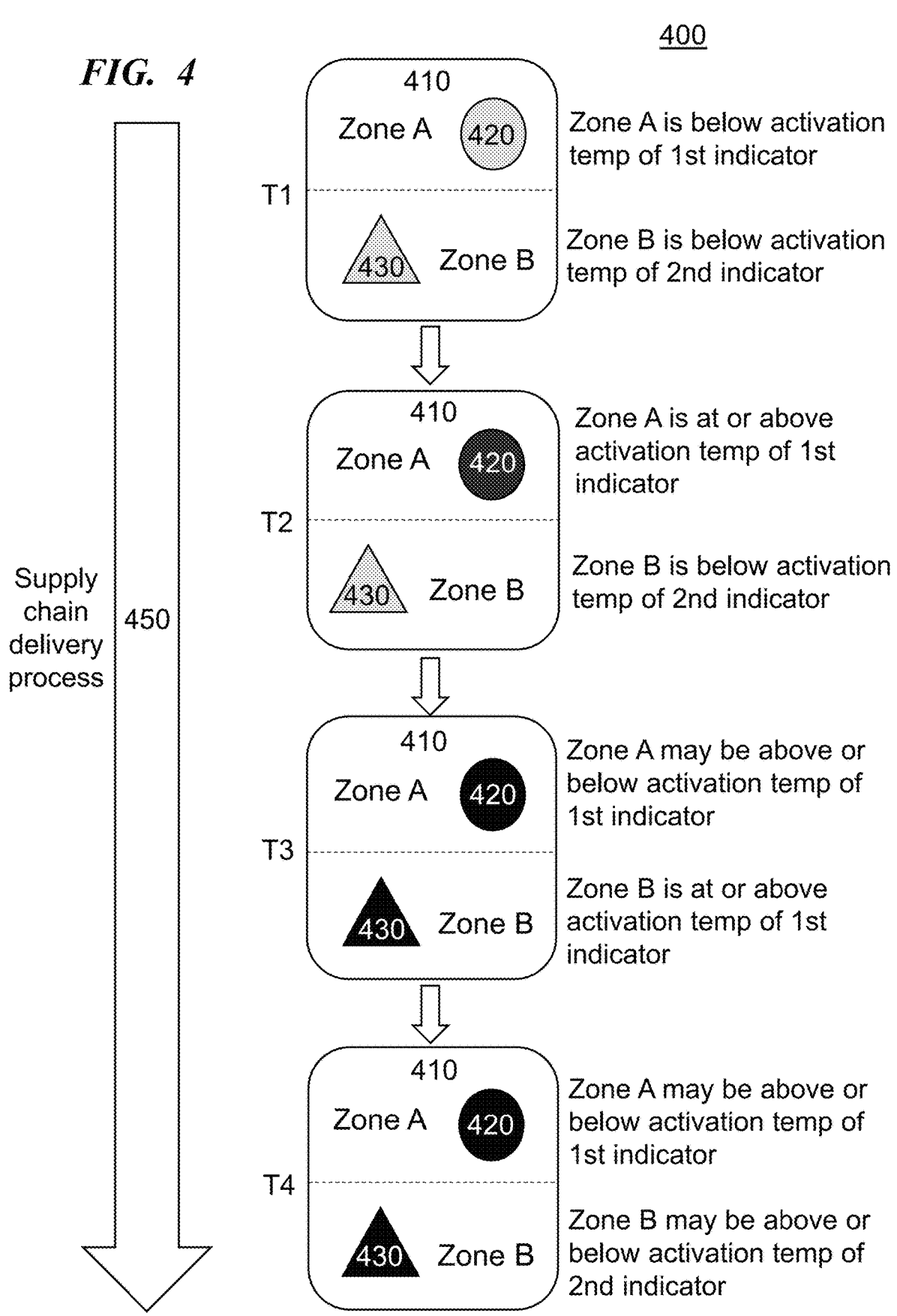
FIG. 4 illustrates a simplified view of an exemplary customer alert system illustrating at least two irreversible thermochromic indicators affixed to a product during a supply chain delivery process, in accordance with some embodiments.

The thermochromic indicator may be affixed or otherwise applied to any portion of any part of an interior and/or exterior packaging of the retail product prior to commencing the supply chain delivery process. In some embodiments, the thermochromic indicator may be affixed or otherwise applied to the inner packaging of the retail product. In other embodiments, the thermochromic indicator may be affixed or otherwise applied to the outermost packaging of the retail product. In some embodiments, the thermochromic indicator may be affixed or otherwise applied to the retail product itself prior to commencing the supply chain delivery process. In some embodiments, as shown in FIG. 4, at least two thermochromic indicators may be affixed, or otherwise applied, to at least two different zones or portions of the retail product prior to commencing the supply chain delivery process. The at least two thermochromic indicators may have the same activation temperatures or different activation temperatures, may comprise the same or different thermochromic materials, and/or may exhibit the same or different inactivation colors and activation colors as one another, depending on, for example, product, packaging, and delivery variables.

The customer verification system 106 may comprise a verification circuit coupled to a user interface, the verification circuit being configured to obtain, via the user interface, verification from a customer receiving the retail product that the thermochromic indicator exhibits the first color. For example, when the customer receives a delivered retail product on which one or more thermochromic indicators are affixed or otherwise applied, the customer can visually determine whether the retail product experienced a temperature above one or more threshold temperatures based on a color change of the thermochromic indicator. In some embodiments, the retail product may be accompanied by instructions, which may be, for example, packaged with the retail product, affixed or otherwise applied to the packaging, or as part of the thermochromic indicator itself, explaining to the customer the purpose of the thermochromic indicator and how to identify or otherwise interpret any color change. In some embodiments, the customer may be instructed or otherwise prompted to verify via a user interface that the thermochromic indicator has not undergone a color change, thus indicating product temperature compliance during delivery. The user interface may be displayed on any electronic device capable of displaying a user interface. For example, the electronic device comprise any mobile phone, tablet, or desktop computer. In some embodiments, the electronic device may comprise a handheld device carried by a delivery driver of a delivery vehicle. In some embodiments, the user interface may comprise any web-based internet browser or application for a mobile phone or tablet.

Figure 2:
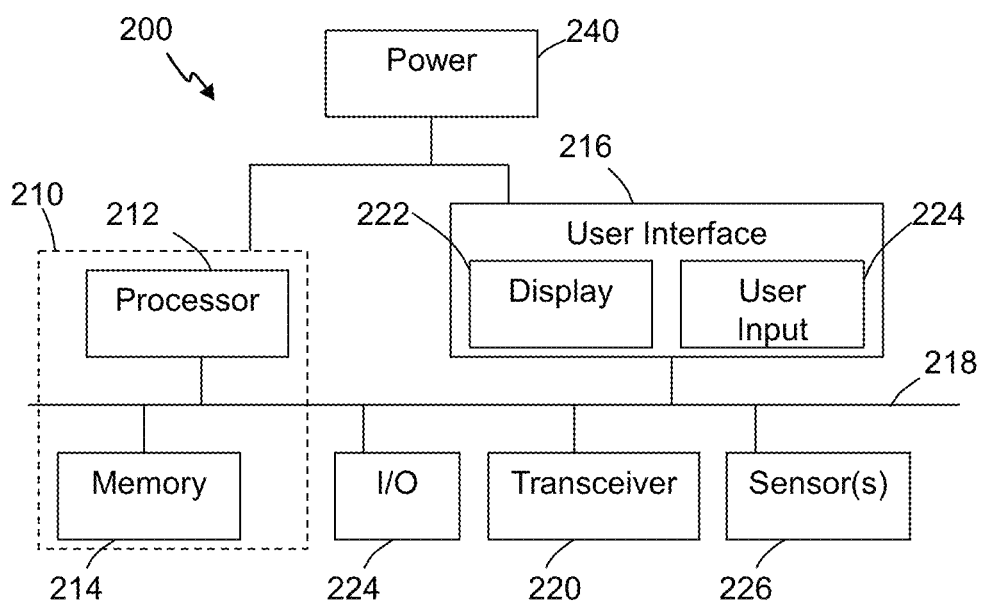
FIG. 2 illustrates an exemplary system for use in implementing methods, techniques, devices, apparatuses, systems, servers, sources and the like in alerting customers to product temperature compliance during delivery, in accordance with some embodiments.

Further, the processes, methods, techniques, circuits, circuitry, systems, devices, functionality, services, servers, sources and the like described herein may be utilized, implemented and/or run on many different types of devices and/or systems. FIG. 2 illustrates an exemplary system 200 that may be used for implementing any of the components, circuits, circuitry, systems, functionality, apparatuses, process, or device of the system 100 of FIG. 1 and/or mentioned above or below, or parts of such circuit, circuitry, functionality, systems, apparatuses, processes, or devices. For example, the system 200 may be used to implement some or all of the indicator selection system 102, customer verification system 106, temperature control systems 108-110, delivery vehicles 112, inventory systems 114, and/or other such components, circuitry, functionality and/or devices. However, the use of the system 200 or any portion thereof is certainly not required.

By way of example, the system 200 may comprise a control circuit or processor module 212, memory 214, and one or more communication links, paths, buses or the like 218. Some embodiments may include one or more user interfaces 216, and/or one or more internal and/or external power sources or supplies 240. The control circuit 212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 212 can be part of control circuitry and/or a control system 210, which may be implemented through one or more processors with access to one or more memory 214 that can store code that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 200 may be used to implement one or more of the above or below, or parts of, components, circuits, systems, process and the like. For example, the system may implement the indicator selection system 102 with the control circuit being an indicator selection circuit, a customer verification system with the control circuit being a verification circuit, a temperature control system with the control circuit being a temperature control circuit, or other components.

The user interface 216 can allow a user to interact with the system 200 and receive information through the system. In some instances, the user interface 216 includes a display 222 and/or one or more user inputs 224, such as a buttons, touch screen, track ball, keyboard, mouse, etc., which can be part of or wired or wirelessly coupled with the system 200. Typically, the system 200 further includes one or more communication interfaces, ports, transceivers 220 and the like allowing the system 200 to communicate over a communication bus, a distributed computer and/or communication network 120 (e.g., a local area network (LAN), the Internet, wide area network (WAN), etc.), communication link 218, other networks or communication channels with other devices and/or other such communications or combinations thereof. Further the transceiver 220 can be configured for wired, wireless, optical, fiber optical cable, satellite, or other such communication configurations or combinations of two or more of such communications. Some embodiments include one or more input/output (I/O) ports 234 that allow one or more devices to couple with the system 200. The I/O ports can be substantially any relevant port or combinations of ports, such as but not limited to USB, Ethernet, or other such ports. Some embodiments may include more than one user interface 216, one of which may form part of the customer verification system described above, which allows the customer to verify to the retailer and/or the shipper that the thermochromic indicator indicates that the temperature of the product did not exceed the threshold temperature during delivery.

The system 200 comprises an example of a control and/or processor-based system with the control circuit 212. Again, the control circuit 212 can be implemented through one or more processors, controllers, central processing units, logic, software and the like. Further, in some implementations the control circuit 212 may provide multiprocessor functionality.

The memory 214, which can be accessed by the control circuit 212, typically includes one or more processor readable and/or computer readable media accessed by at least the control circuit 212, and can include volatile and/or nonvolatile media, such as RAM, ROM, EEPROM, flash memory and/or other memory technology. Further, the memory 214 is shown as internal to the control system 210; however, the memory 214 can be internal, external or a combination of internal and external memory. Similarly, some or all of the memory 214 can be internal, external or a combination of internal and external memory of the control circuit 212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory. The memory 214 can store code, software, executables, scripts, data, content, lists, programming, programs, log or history data, user information and the like. While FIG. 2 illustrates the various components being coupled together via a bus, it is understood that the various components may actually be coupled to the control circuit and/or one or more other components directly.

Some embodiments include the I/O interface 234 that allows wired and/or wireless communication coupling of/to external components, such as with indicator selection system 102, one or more databases 104, customer verification system 106, one or more temperature control systems 108-110, delivery vehicles 112, inventory system 114, and other such devices or systems. Typically, the I/O interface provides wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

Figure 3:
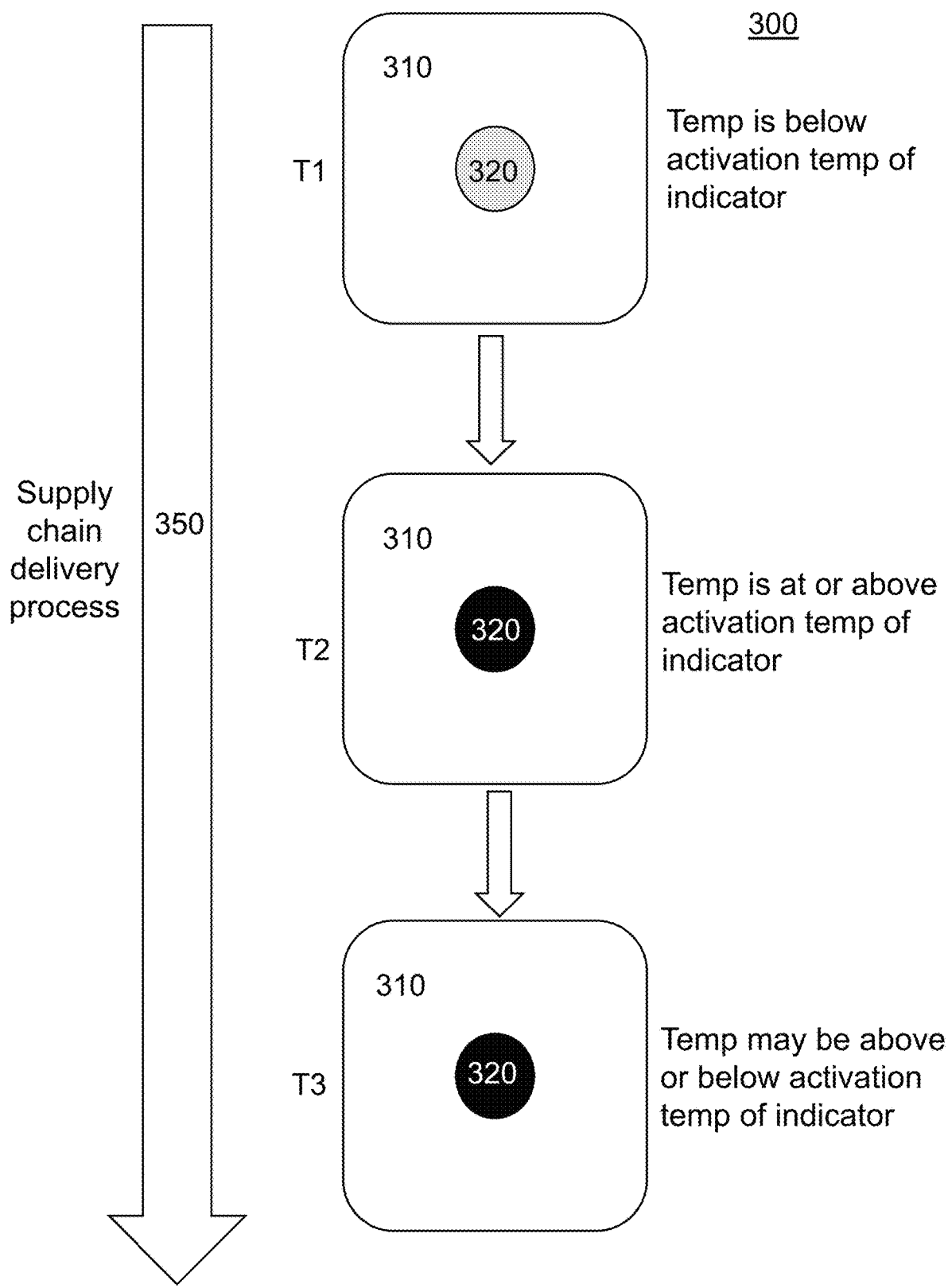
FIG. 3 illustrates a simplified view of an exemplary customer alert system illustrating an irreversible thermochromic indicator affixed to a product during a supply chain delivery process, in accordance with some embodiments.

FIG. 3 illustrates a simplified view of an exemplary customer alert system 300 illustrating an irreversible thermochromic indicator 320 affixed to a retail product 310 during a supply chain delivery process, in accordance with some embodiments. The thermochromic indicator 320 has an activation temperature that corresponds to a temperature threshold of the retail product 310. In FIG. 3, the thermochromic indicator 320 is affixed to product 310, which travels through a supply chain delivery process 350 from the start of the supply chain delivery process (T1), when delivery is commenced, to the completion of the supply chain delivery process (T3), when the retail product is delivered to the customer. In the example illustrated in FIG. 3, the temperature of the thermochromic indicator 320 at the commencement of the delivery process (T1) is below the activation temperature of the indicator. As such, the thermochromic indicator 320 illustrates a first, inactivated color.

As discussed above, the temperature of the retail product 310 in the supply chain delivery process 350, and the temperature of the thermochromic indicator 320 affixed to the retail product 310 thereof, may fluctuate during delivery of the retail product. At T2 in FIG. 3, the temperature of the retail product 310, and of the thermochromic indicator 320, rises to a temperature that exceeds an activation temperature of the thermochromic indicator 320, which corresponds to a threshold temperature of the retail product. In such an event, the thermochromic indicator 320 irreversibly changes from its first color to a second color that is different from the first color. By the time the retail product 310 is delivered to the customer at T3, the temperature of the retail product 310, and of the thermochromic indicator 320, may have dropped below the activation temperature of the thermochromic indicator 320. Nonetheless, the color of the thermochromic indicator 320 does not revert back to its first color when the temperature decreases below the activation temperature. Instead, the irreversible thermochromic indicator 320 maintains its second color, alerting the customer that the retail product 310 experienced one or more temperature increases above a threshold temperature for the retail product at some point during the supply chain delivery process 350.

FIG. 4 illustrates a simplified view of an exemplary customer alert system 400 illustrating two irreversible thermochromic indicators affixed to different locations of a retail product during a supply chain delivery process, in accordance with some embodiments. In FIG. 4, two thermochromic indicators 420 and 430 are affixed to a product 410 traveling through a supply chain delivery process 450 from the start of the supply chain delivery process (T1), when delivery is commenced, to the completion of the supply chain delivery process (T4), when the retail product is delivered to the customer. Thermochromic indicators 420 and 430 may have different activation temperatures, or may have the same activation temperatures, and are affixed to different locations (Zone A and Zone B, respectively) of the retail product 410, depending on temperature threshold(s) for the retail product and the manner in which the retail product is packaged and delivered. For example, a retail product may have more than one temperature thresholds, which may be based on zones of the retail product and/or packaging of the retail product, or the retailer may affix multiple thermochromic indicators having the same activation temperature to ensure that a representative area of the retail product is monitored for temperature changes during delivery. In either case, the temperatures of the thermochromic indicators 420 and 430 at the commencement of the delivery process (T1) are below the activation temperatures of both thermochromic indicators 420 and 430. As such, thermochromic indicators 420 and 430 illustrate first, inactivated colors. The first, inactivated color of each of thermochromic indicator 420 and 430 may be the same color or may be different colors. In some embodiments, thermochromic indicators 420 and 430 may comprise the same or different thermochromic materials.

As discussed above, the temperatures of Zone A and Zone B of retail product 410 in the supply chain delivery process 450, and the temperatures of the thermochromic indicators 420 and 430 affixed to Zones A and B of the retail product 410, may fluctuate independently or collectively during delivery of the retail product depending on, for example, positioning of the retail product in the delivery vehicle, type of temperature control system used in the vehicle (if any), or the type of packaging/delivery container used to deliver the retail product. At T2 in FIG. 4, the temperature of Zone A of the retail product 410, and of the thermochromic indicator 420, rises to a temperature that exceeds an activation temperature of thermochromic indicator 420, which corresponds to a threshold temperature of Zone A of the retail product 410. In such an event, the thermochromic indicator 420 irreversibly changes from its first color to a second color that is different from its first color.

At T3 in FIG. 4, the temperature of Zone B of the retail product 410, and of the thermochromic indicator 430, rises to a temperature that exceeds an activation temperature of thermochromic indicator 430, which corresponds to a threshold temperature of Zone B of the retail product 410. In such an event, the thermochromic indicator 430 irreversibly changes from its first color to a second color that is different from its first color. The activation temperature of thermochromic indicator 430 may be higher, lower, or equal to the activation temperature of thermochromic indicator 420. In any case, irreversible thermochromic indicator 420 at T3 does not revert back to its first color even if the temperature decreases below its activation temperature, and, instead, maintains its first color.

By the time the retail product 410 is delivered to the customer at T4, the temperatures of Zone A and Zone B of the retail product 410, and of the thermochromic indicators 420 and 430, may have dropped below the respective activation temperature(s) of the thermochromic indicators 420 and 430. Nevertheless, the thermochromic indicators 420 and 430 do not revert back to their first colors when their temperatures decrease below the activation temperature of each thermochromic indicator. Instead, the irreversible thermochromic indicators 420 and 430 maintain their second respective colors, alerting the customer that one or both zones of the retail product 410 experienced one or more temperature increases above a threshold temperatures for Zone A and Zone B of the retail product 410 at some point during the supply chain delivery process 450.

Although FIGS. 3 and 4 illustrate specific numbers and configurations of thermochromic indicators, it should be understood that any number and configuration of thermochromic indicators may be used, depending on product, packaging, and delivery variables.

Figure 5:
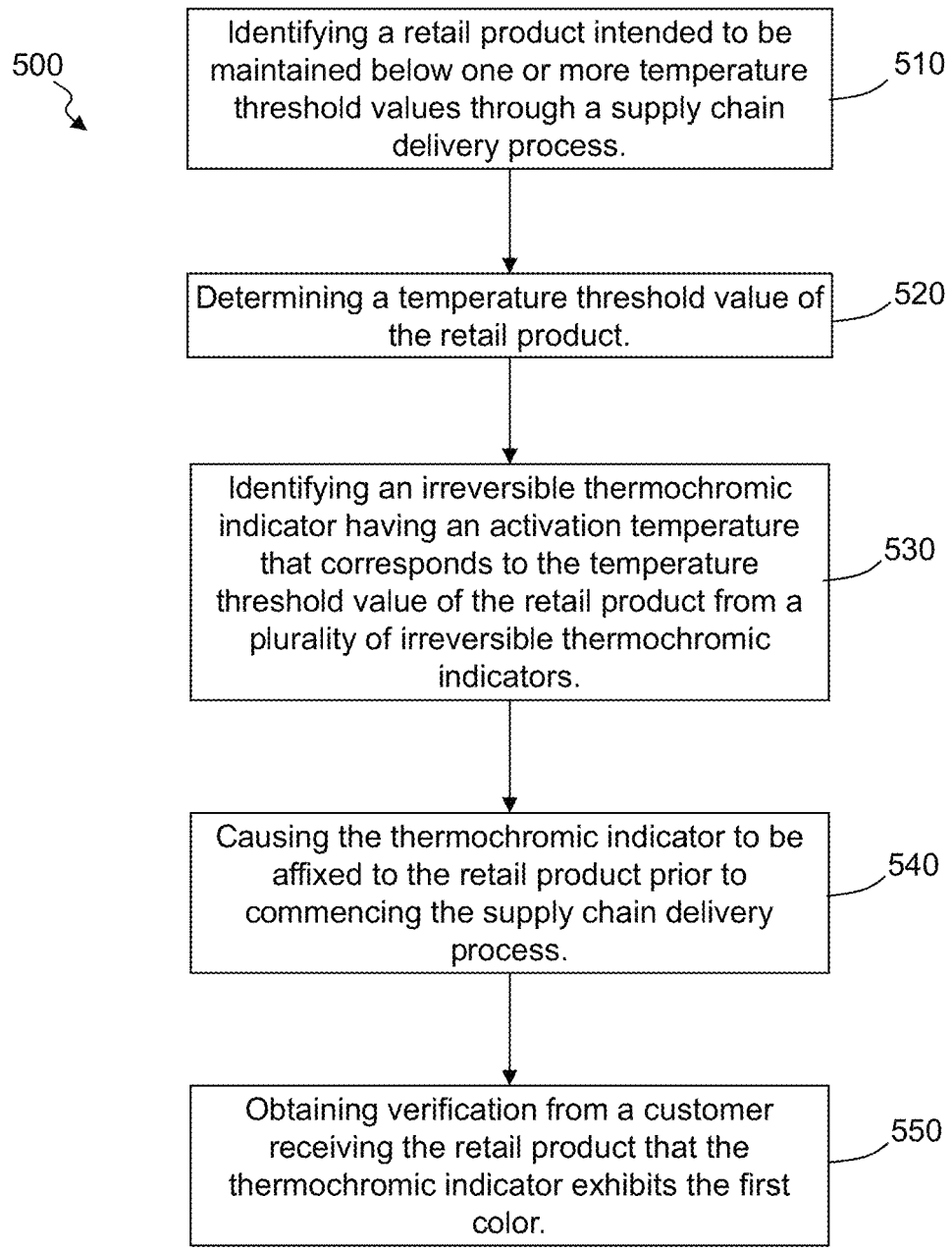
FIG. 5 illustrates a simplified flow diagram of an exemplary process of alerting customers to product temperature compliance during delivery, in accordance with some embodiments.

FIG. 5 illustrates a simplified flow diagram of an exemplary process of alerting customers to product temperature compliance delivery, in accordance with some embodiments. Generally, the method shown in FIG. 5 may be implemented with a processor based device such as a control circuit, a central processor, a product database, a user interface, and the like. In some embodiments, the method shown in FIG. 2 may be implemented with the system illustrated in FIG. 1.

In step 510, the system identifies a retail product intended to be maintained below one or more temperature threshold values through a supply chain delivery process, the supply chain delivery process including at least one portion thereof where the retail product is subject to an uncontrolled temperature environment. In some embodiments, the system may identify one or more products that have one or more threshold temperatures that are to be maintained and/or not to be exceeded during delivery to a delivery location. For example, a product may have one or more of a desired storage threshold temperature, a desired transport temperature, a regulatory or government specified temperature threshold, other such temperature thresholds, and in some instances a combination of two or more temperature thresholds. Further, some of the temperature thresholds may correspond to time thresholds, where for a particular product it may be desired that the product be maintained below a first temperature threshold, but can exceed the first temperature for less than a threshold duration of time and typically while being maintained under a second temperature threshold. The retail product may comprise any product that has one or more temperature thresholds that are not to be exceeded during delivery. In some embodiments, the retail product may comprise a product selected from the group consisting of food products, pharmaceutical products, medical devices, horticulture products, or other perishable products.

In step 520, the system determines a temperature threshold value of the retail product. One or more databases may be accessed (e.g., product database, inventory database, regulatory database, product temperature requirements database, geographic temperature database, etc.) to identify or otherwise determine temperature threshold information for each product to be delivered. In some embodiments, a first temperature threshold may correspond to a first zone of the retail product and a second temperature threshold may correspond to a second zone of the retail product. The first and second temperature thresholds may be the same or different temperature threshold values.

In step 530, the system identifies a thermochromic indicator having an activation temperature that corresponds to the temperature threshold value of the retail product from a plurality of irreversible thermochromic indicators, each thermochromic indicator having a predetermined activation temperature and being capable of irreversibly changing color from a first color to a second color when a temperature of the thermochromic indicator increases above the activation temperature during any point in time during the supply chain delivery process. The system may automatically select and provide one or more thermochromic indicators having an activation temperature that corresponds to the one or more threshold delivery temperatures of each retail product. In some embodiments, the system may identify a first thermochromic indicator and a second thermochromic indicator from the plurality of thermochromic indicators, the first thermochromic indicator having an activation temperature that corresponds to a first temperature threshold value of the retail product, and the second thermochromic indicator having an activation temperature that corresponds to a second temperature threshold value of the retail product. The first temperature threshold may correspond to the first zone of the retail product and the second temperature threshold may correspond to the second zone of the retail product. The first and second temperature thresholds may be the same or different temperature threshold values.

In some embodiments, the system may evaluate information from one or more databases (e.g., one or more inventory databases, product databases, product temperature requirements databases, geographic temperature databases, route parameter databases, etc.) to automatically determine and/or select, via a control circuit, a specific thermochromic indicator from a plurality of different irreversible thermochromic indicators, with each indicator having a different predetermined activation temperature. In some embodiments, the activation temperature of the thermochromic indicator may correspond to a temperature safety value associated with the retail product such that the thermochromic indicator changing color from the first color to the second color indicates to the customer upon delivery that the retail product may be unsafe for its recommended use. The thermochromic indicator may comprise any thermochromic material or composition that is capable of irreversibly changing color when a temperature of the thermochromic indicator increases above a predetermined activation temperature. For example, the thermochromic indicator may comprises at least one of thermochromic ink, thermochromic liquid crystals, thermochromic leuco dye, thermochromic paper, thermochromic polymer, and combinations thereof.

In some embodiments, the thermochromic indicator may include an adhesive material and/or a binder to affix the thermochromic material or composition to the retail product. For example, in some embodiments, the thermochromic indicator may comprise a substrate having an adhesive surface and a printable surface, and a thermochromic composition or material printed on the printable surface of the substrate. The thermochromic material may comprise any thermochromic material or composition described above.

For example, the thermochromic surface may include a thermochromic ink. In some embodiments, the thermochromic indicator may be a sticker or label comprising an adhesive surface and a thermochromic surface. In other embodiments, the thermochromic indicator may include a thermochromic pigment and a binder, such that the thermochromic indicator may resemble an adhesive paint or paste that may be applied to the retail product. The binder may be any conventional binder material known in the art, while the thermochromic material may comprise any thermochromic material or composition known in the art.

In step 540, the system causes the thermochromic indicator to be affixed to the retail product prior to commencing the supply chain delivery process. In some embodiments, the system may automatically output an indication of the selected thermochromic indicator, such as, for example, a bar code, UPC code, QR code or any other identifier, to an indicator applicator, which may automatically obtain and apply the indicator to the retail product based on the indication. In some embodiments, a worker may affix or otherwise apply the thermochromic indicator to the retail product.

The thermochromic indicator may be affixed or otherwise applied to any portion of any part of an interior and/or exterior packaging of the retail product prior to commencing the supply chain delivery process. In some embodiments, the thermochromic indicator may be affixed or otherwise applied to the inner packaging of the retail product. In other embodiments, the thermochromic indicator may be affixed or otherwise applied to the outermost packaging of the retail product. In some embodiments, the thermochromic indicator may be affixed or otherwise applied to the retail product itself prior to commencing the supply chain delivery process. In some embodiments, as shown in FIG. 4, at least two thermochromic indicators may be affixed or otherwise applied to at least two different parts or zones of the retail product prior to commencing the supply chain delivery process. In such a case, the first thermochromic indicator may be affixed to a first zone of the retail product and has an activation temperature that corresponds to a temperature threshold value of the first zone, and the second thermochromic indicator may affixed to a second zone of the retail product and has an activation temperature that corresponds to a temperature threshold value of the second zone. The at least two thermochromic indicators may have the same activation temperatures or different activation temperatures, may comprise the same or different thermochromic materials, and/or may exhibit the same or different inactivation colors and activation colors as one another, depending on, for example, product, packaging, and delivery variables.

In step 550, the system obtains, via a user interface, verification from a customer receiving the retail product that the one or more thermochromic indicators exhibit the respective first color, confirming product temperature compliance. For example, when the customer receives a delivered retail product on which one or more thermochromic indicators are affixed or otherwise applied, the customer can visually determine whether the retail product experienced a temperature above one or more threshold temperatures based on a color change of the thermochromic indicator. In some embodiments, the retail product may be accompanied by instructions, which may be, for example, packaged with the retail product, affixed or otherwise applied to the packaging, or as part of the thermochromic indicator itself, explaining to the customer the purpose of the thermochromic indicator and how to identify or otherwise interpret any color change. The user interface may be displayed on any electronic device capable of displaying a user interface. For example, the electronic device comprise any mobile phone, tablet, or desktop computer. In some embodiments, the electronic device may comprise a handheld device carried by a delivery driver of a delivery vehicle. In some embodiments, the user interface may comprise any web-based internet browser or application for a mobile phone or tablet.

In one embodiment, a customer alert system to alert customers to product temperature compliance comprises: a retail product intended to be maintained below one or more temperature threshold values through a supply chain delivery process, the supply chain delivery process including at least one portion thereof where the retail product is subject to an uncontrolled temperature environment; a product database comprising recommended temperature threshold values for a plurality of retail products; a plurality of irreversible thermochromic indicators, each thermochromic indicator having a predetermined activation temperature and being capable of irreversibly changing color from a first color to a second color when a temperature of the thermochromic indicator increases above the activation temperature during any point in time during the supply chain delivery process; a customer user interface; and a control circuit coupled to the product database and the customer user interface, the control circuit configured to: identify the retail product; determine, based at least on information about the retail product in the product database, a temperature threshold value of the retail product; identify a thermochromic indicator from the plurality of a thermochromic indicators, the thermochromic indicator having an activation temperature that corresponds to the temperature threshold value of the retail product; cause the thermochromic indicator to be affixed to the retail product prior to commencing the supply chain delivery process; and obtain, via the customer user interface, verification from a customer receiving the retail product that the thermochromic indicator exhibits the first color.

In some embodiments, the temperature threshold value corresponds to a first zone of the retail product and the thermochromic indicator is affixed to the first zone retail product prior to commencing the supply chain delivery process, and the control circuit is further configured to: determine, based at least on information about the retail product in the product database, a second temperature threshold value of the retail product, the second temperature threshold value corresponding to a second zone of the retail product; identify a second thermochromic indicator from the plurality of a thermochromic indicators, the second thermochromic indicator having a second activation temperature that corresponds to the second temperature threshold value of the retail product; cause the second thermochromic indicator to be affixed to the second zone of the retail product prior to commencing the supply chain delivery process; and obtain, via the customer user interface, verification from a customer receiving the retail product that the second thermochromic indicator exhibits the first color.

In one embodiment, a method for alerting a customer to product temperature non-compliance comprises: identifying a retail product intended to be maintained below one or more temperature threshold values through a supply chain delivery process, the supply chain delivery process including at least one portion thereof where the retail product is subject to an uncontrolled temperature environment; determining, based at least on information about the retail product in a product database, a temperature threshold value of the retail product; identifying a thermochromic indicator having an activation temperature that corresponds to the temperature threshold value of the retail product from a plurality of irreversible thermochromic indicators, each thermochromic indicator having a predetermined activation temperature and being capable of irreversibly changing color from a first color to a second color when a temperature of the thermochromic indicator increases above the activation temperature during any point in time during the supply chain delivery process; causing the thermochromic indicator to be affixed to the retail product prior to commencing the supply chain delivery process; and obtaining, via a user interface, verification from a customer receiving the retail product that the thermochromic indicator exhibits the first color.

In some embodiments, the temperature threshold value corresponds to a first zone of the retail product and the thermochromic indicator is affixed to the first zone retail product prior to commencing the supply chain delivery process and the method further comprises: determining, based at least on information about the retail product in the product database, a second temperature threshold value of the retail product, the second temperature threshold value corresponding to a second zone of the retail product; identifying a second thermochromic indicator from the plurality of a thermochromic indicators, the second thermochromic indicator having a second activation temperature that corresponds to the second temperature threshold value of the retail product; causing the second thermochromic indicator to be affixed to the second zone of the retail product prior to commencing the supply chain delivery process; and obtaining, via the customer user interface, verification from a customer receiving the retail product that the second thermochromic indicator exhibits the first color.

It should be understood that each of the components of the system described herein may be in communication with one another using any conventional communications protocol, including wireless communication protocols. Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A customer alert system for product temperature compliance, the system comprising:
   a retail product having a first zone and a second zone intended to be maintained below one or more temperature threshold values through a supply chain delivery process, the supply chain delivery process including at least one portion thereof where the retail product is subject to an uncontrolled temperature environment;
   a product database comprising recommended temperature threshold values for a plurality of retail products;
   a plurality of irreversible thermochromic indicators, each thermochromic indicator comprising a thermochromic material having a predetermined activation temperature and being capable of irreversibly changing color from an initial color to an activated color when a temperature of the thermochromic material increases above the activation temperature during any point in time during the supply chain delivery process;
   a customer user interface; and
   a control circuit coupled to the product database and the customer user interface, the control circuit configured to:
   identify the retail product intended to be maintained below one or more temperature threshold values through a supply chain delivery process;
   determine, based at least on information about the retail product in the product database, a temperature threshold value of each of the first and second zones of the retail product, wherein the first and second zones have different temperature threshold values;
   identify a first thermochromic indicator from the plurality of thermochromic indicators, the first thermochromic indicator comprising a thermochromic material having an activation temperature that corresponds to the temperature threshold value of the first zone of the retail product;
   identify a second thermochromic indicator from the plurality of thermochromic indicators, the second thermochromic indicator comprising a thermochromic material having an activation temperature that corresponds to the temperature threshold value of the second zone of the retail product;
   cause the first and second thermochromic indicators to be affixed to the first and second zones of the retail product, respectively, prior to commencing the supply chain delivery process; and
   obtain, via the customer user interface, verification from a customer receiving the retail product that the first and second thermochromic indicators exhibit the initial color associated with each indicator,
   wherein the first and second indicators are affixed to an inner packaging of the retail product.

2. The system of claim 1, wherein the activation temperature corresponds to a temperature safety value associated with the retail product such that the thermochromic material changing color from the first initial color to the second activated color indicates that the retail product may be unsafe for its recommended use.

3. The system of claim 1, wherein the thermochromic material comprises at least one of thermochromic ink, thermochromic liquid crystals, thermochromic leuco dye, thermochromic paper, thermochromic polymer, and combinations thereof.

4. The system of claim 1, wherein the thermochromic indicator comprises a thermochromic pigment and a binder.

5. The system of claim 1, wherein the thermochromic indicator comprises a substrate having an adhesive surface and a printable surface, and a thermochromic ink printed on the printable surface of the substrate.

6. The system of claim 1, wherein the retail product comprises a product selected from the group consisting of food products, pharmaceutical products, medical devices, horticulture products, and combinations thereof.

7. A method for alerting a customer to product temperature compliance, the method comprising:
   identifying a retail product having a first zone and a second zone intended to be maintained below one or more temperature threshold values through a supply chain delivery process, the supply chain delivery process including at least one portion thereof where the retail product is subject to an uncontrolled temperature environment;
   determining, based at least on information about the retail product in a product database, a temperature threshold value of each of the first and second zones of the retail product, wherein the first and second zones have different temperature threshold values;
   identifying a first thermochromic indicator having an activation temperature that corresponds to the temperature threshold value of the first zone of the retail product and a second thermochromic indicator having an activation temperature that corresponds to the temperature threshold value of the second zone of the retail product from a plurality of irreversible thermochromic indicators, each thermochromic indicator comprising a thermochromic material having a predetermined activation temperature and being capable of irreversibly changing color from an initial color to an activated color when a temperature of the thermochromic material increases above the activation temperature during any point in time during the supply chain delivery process;

causing the first and second thermochromic indicators to be affixed to the first and second zones of the retail product, respectively, prior to commencing the supply chain delivery process; and obtaining, via a user interface, verification from a customer receiving the retail product that the first and second thermochromic indicators exhibit the initial color associated with each indicator, wherein the first and second indicators are affixed to an inner packaging of the retail product.

8. The method of claim 7, wherein the activation temperature corresponds to a temperature safety value associated with the retail product such that the thermochromic material changing color from the initial color to the activated color indicates that the retail product may be unsafe for its recommended use.

9. The method of claim 7, wherein the thermochromic material comprises at least one of thermochromic ink, thermochromic liquid crystals, thermochromic leuco dye, thermochromic paper, thermochromic polymer, and combinations thereof.

10. The method of claim 7, wherein the thermochromic indicator comprises a thermochromic pigment and a binder.

11. The method of claim 7, wherein the thermochromic indicator comprises a substrate having an adhesive surface and a printable surface, and a thermochromic ink printed on the printable surface of the substrate.

12. The method of claim 7, wherein the retail product comprises a product selected from the group consisting of food products, pharmaceutical products, medical devices, horticulture products, and combinations thereof.

* * * * *

UNITED STATES PATENT AND TRADEMARK OFFICE
CERTIFICATE OF CORRECTION

PATENT NO. : 10,520,367 B2
APPLICATION NO. : 15/621284
DATED : December 31, 2019
INVENTOR(S) : Robert Nicholas Harvey Page 1 of 1

It is certified that error appears in the above-identified patent and that said Letters Patent is hereby corrected as shown below:

In the Claims

Column 14, Line 29, Claim 2, delete "the first" and insert -- the --, therefor.

Column 14, Line 29, Claim 2, delete "the second" and insert -- the --, therefor.

Signed and Sealed this
Thirty-first Day of March, 2020

Andrei Iancu
*Director of the United States Patent and Trademark Office*